United States Patent
Ohkaji et al.

[11] Patent Number: 5,719,684
[45] Date of Patent: Feb. 17, 1998

[54] IMAGE FORMING APPARATUS HAVING AN ENDLESS CONVEYING AND TRANSFERRING BELT WITH AN INTERRUPT CONTROL

[75] Inventors: Hiroyuki Ohkaji, Yokohama; Masato Yokoyama, Tokyo; Masumi Sato, Yokohama, all of Japan

[73] Assignee: Ricoh Company, Ltd., Tokyo, Japan

[21] Appl. No.: 651,643

[22] Filed: May 22, 1996

[30] Foreign Application Priority Data

May 24, 1995 [JP] Japan ................................. 7-125094
May 10, 1996 [JP] Japan ................................. 8-115924

[51] Int. Cl.⁶ .............................. H04N 1/29; H04N 1/41; G01D 15/06; G03G 21/00
[52] U.S. Cl. .......................... 358/300; 358/426; 358/437; 358/539; 347/154; 399/87
[58] Field of Search .................. 358/296, 300, 358/400, 401, 404, 426, 437, 443, 448, 468, 500, 501, 539; 347/154; 399/1–4, 38, 46, 75, 82, 83, 85, 87, 239, 288, 313, 329

[56] References Cited

U.S. PATENT DOCUMENTS 3,920,453  11/1975  Gasner ................................. 399/288
4,638,339  1/1987   Coburn et al. ...................... 347/154
5,189,479  2/1993   Matsuda et al. .................... 355/274

FOREIGN PATENT DOCUMENTS

1-233470   9/1989   Japan.
3-23468    1/1991   Japan.
3-107976   5/1991   Japan.
6-27832    2/1994   Japan.
6-43765    2/1994   Japan.
6-83218    3/1994   Japan.
6-167899   6/1994   Japan.

*Primary Examiner*—Eric Frahm
*Attorney, Agent, or Firm*—Oblon, Spivak, McClelland, Maier & Neustadt, P.C.

[57] ABSTRACT

In an image forming apparatus having an endless transferring and conveying device for conveying a recording medium and electrostatically transferring a toner image from an image carrier to the medium, the mechanical operation of an image forming section is interrupted throughout the duration of preselected image processing executed by image processing means. As a result, the amount of toner to reach a cleaning section assigned to the endless transferring and conveying means is reduced. This frees the recording medium from contamination ascribable to defective cleaning and thereby insures attractive images.

26 Claims, 9 Drawing Sheets

IMAGE FORMING APPARATUS HAVING AN ENDLESS CONVEYING AND TRANSFERRING BELT WITH AN INTERRUPT CONTROL

BACKGROUND OF THE INVENTION

The present invention relates to a copier, facsimile apparatus, printer or similar image forming apparatus.

An image forming apparatus has reading means and an image forming section and often allows an ADF (Automatic Document Feeder) and a sorter to be mounted thereto. The reading means reads a document laid on a glass platen while outputting image data representative of the document. The ADF sequentially feeds a stack of documents to the glass platen and drives each document out of the platen after it has been read by the reading means.

The image forming section has a rotatable photoconductive drum or similar image carrier. Toner image forming means forms a toner image on the drum in accordance with the image data received from the reading means. An image transfer device transfers the toner image from the drum to a recording medium. A charger or similar separating means separates the medium from the image carrier. Fixing means fixes the toner image transferred to the medium. After the transfer of the toner image from the drum to the medium, a drum cleaning device removes the toner remaining on the drum. The medium with the toner image and come out of the fixing device is driven out of the apparatus.

The toner image forming means has charging means for uniformly charging the surface of the drum, exposing means for exposing the charged surface of the drum imagewise to thereby electrostatically form a latent image, and developing means for developing the latent image with toner to thereby produce a toner image. The drum cleaning device and a cleaning device assigned to the endless conveyor member are each implemented as, e.g., an elastic cleaning blade. The drum or image carrier has a base formed of, e.g., aluminum and a photoconductive layer formed on the base and formed of a photoconductive insulator.

The sorter sorts the recording media sequentially driven out of the apparatus. The image transfer device is implemented as a transfer charger or by endless transferring and conveying means. The endless transferring and conveying means is made up of a transfer belt, a transfer roller or similar endless conveyor member, a transfer electrode for depositing transfer charge on the conveyor member, moving means for selectively moving the conveyor member into or out of contact with the image carrier, and the previously mentioned cleaning device. The transfer belt is often formed of rubber or similar elastic material because such a material promotes easy control over the sideways displacement of the belt.

Japanese Patent Laid-Open Publication No. 63-83768, for example, discloses an image forming apparatus of the type using a transfer belt capable of surely conveying a paper or similar recording medium. In this type of apparatus, the probability that the recording medium with the toner image transferred from the image carrier jams the path when separated from the image carrier is far lower than in an apparatus using a transfer roller.

A copier having an ADF and a sorter is conventional and meets the demand for multiple functions and advanced copying functions. Today, digital copiers replacing analog copiers in order to implement multiple functions and advanced copying functions. With a digital copier, it is possible to electrically sort recording media without resorting to an ADF or a sorter, and to produce any desired number of copies of a single document by reading the document only once.

In an analog copier, a photoconductive element is uniformly charged by charging means and then exposed imagewise by light directly derived from a document. As a result, a latent image is electrostatically formed on the element. Specifically, while a light source illuminates or scans a document, the resulting reflection from the document is incident to the photoconductive element. The latent image is developed by developing means and then transferred to a paper or similar recording medium by image transferring means.

A digital copier has a memory for storing image data representative of a document and is capable of electrically sorting recording media without resorting to the ADF or the sorter. To produce a plurality of copies with a single document, the analog copier must read the document repeatedly. By contrast, the digital copier have only to read the document once because of the memory. Let the copying operation using the memory be referred to memory copying.

As to electronic sorting, reading means sequentially reads the first document to the N-th document while outputting corresponding image data. An image processing section executes preselected image processing with the individual image data. Compressing means compresses the processed image data and then writes the compressed image data in the memory. In response to a sort command, the image data representative of the first to N-th documents are repeatedly read out of the memory a number of times corresponding to a desired number of sets of copies. An image forming section causes its writing means to perform a copying operation (image formation) the number of times corresponding to the desired sets of copies. The image data read out of the memory are expanded by expanding means.

For memory copying, image data output from the reading means and representative of a document are subjected to the preselected image processing by the image processing section, compressed by the compressing means, and then written to the memory. The image data are repeatedly read out of the memory a number of times corresponding to a desired number of copies. The image forming section causes its writing means to perform the copying operation the number of times corresponding to the desired number of copies.

The cleaning device assigned to the endless conveyor member and implemented as, e.g., an elastic cleaning blade removes the toner from the conveyor member. The problem with this kind of cleaning device is that when the toner reaches the position where the cleaning device is located in a great amount, the device fails to fully remove the toner from the conveyor member. As a result, the toner is transferred from the conveyor member to the recording medium to contaminate it and prevents an attractive image from being produced.

The transfer belt using rubber of similar elastic material as mentioned earlier has the following problem. Because the belt is used in a stretched condition, its surface is apt to crack and causes the toner to move away from the cleaning blade. Hence, the margin regarding the cleaning ability is smaller with the belt than with the image carrier whose base is formed of, e.g., aluminum. This aggravates the contamination of the recording medium ascribable to defective cleaning.

A substantial period of time is necessary for the digital copier to form an image, depending on the image forming mode. For example, in an electronic sort mode or a memory copy mode, the image data representative of a document must be compressed before they are written to the memory, consuming a substantial period of time. In addition, the image data read out of the memory must be expanded, also consuming an extra period of time. Specifically, when the analog copier produces a plurality of copies with a single document in a repeat copy mode, the interval between consecutive recording media is 0.2 second to 0.3 second in terms of time. However, when the digital copier comparable in process speed with the analog copier is operated in the electronic sort mode or the memory copy mode, the interval between consecutive media is as long as 1.9 second to 2.0 second. This is because the image processing rate necessary for the compression and expansion of the image data does not sufficiently match the reproducibility of the copier. An image processing device operable at high speed may implement electronic sorting and memory copying without lowering the reproducibility of the copier. However, such an image processing device is too expensive to be installed in the copier.

The increase in the interval between the consecutive recording media causes several times more toner to deposit on the endless conveyor member than during the ordinary copying operation. As a result, the cleaning blade fails to intercept the toner on the conveyor member and causes it to move away from the blade. This part of the toner smears the surface of the conveyor member, and therefore the rear of the following recording medium.

SUMMARY OF THE INVENTION

It is therefore an object of the present invention to provide an image forming apparatus capable of reducing the amount of toner to reach a cleaning section assigned to endless transferring and conveying means, thereby freeing recording media from contamination ascribable to defective cleaning and insuring desirable images.

In accordance with the present invention, an image forming apparatus including an image forming section has an image carrier for forming a toner image thereon. An image processing section processes image data to be written to the image carrier. A developing device develops the image data processed by the image processing section and written to the image carrier with toner to thereby produce a corresponding toner image. Endless transferring and conveying means conveys a recording medium and electrostatically transfers the toner image from the image carrier to the recording medium. A controller interrupts the mechanical operation of the image forming section throughout the duration of processing of the image data by the image processing section.

Also, in accordance with the present invention, an image forming apparatus including an image forming section has an image carrier for forming a toner image thereon. An image processing section processes image data to be written to the image carrier. A developing devoce develops the image data processed by the image processing section and written to the image carrier with toner to thereby produce a corresponding toner image. Endless transferring and conveying means conveys a recording medium and electrostatically transfers the toner image from the image carrier to the recording medium. The endless transferring and conveying means has an endless conveyor member for conveying the recording medium, and a transfer electrode for depositing transfer charge on the endless conveyor member. A controller causes the transfer charge to be continuously applied to the transfer electrode throughout the duration of processing of the image data by the image processing means.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Preferred embodiments of the image forming apparatus in accordance with the present invention will be described.

1st Embodiment

Figure 1:
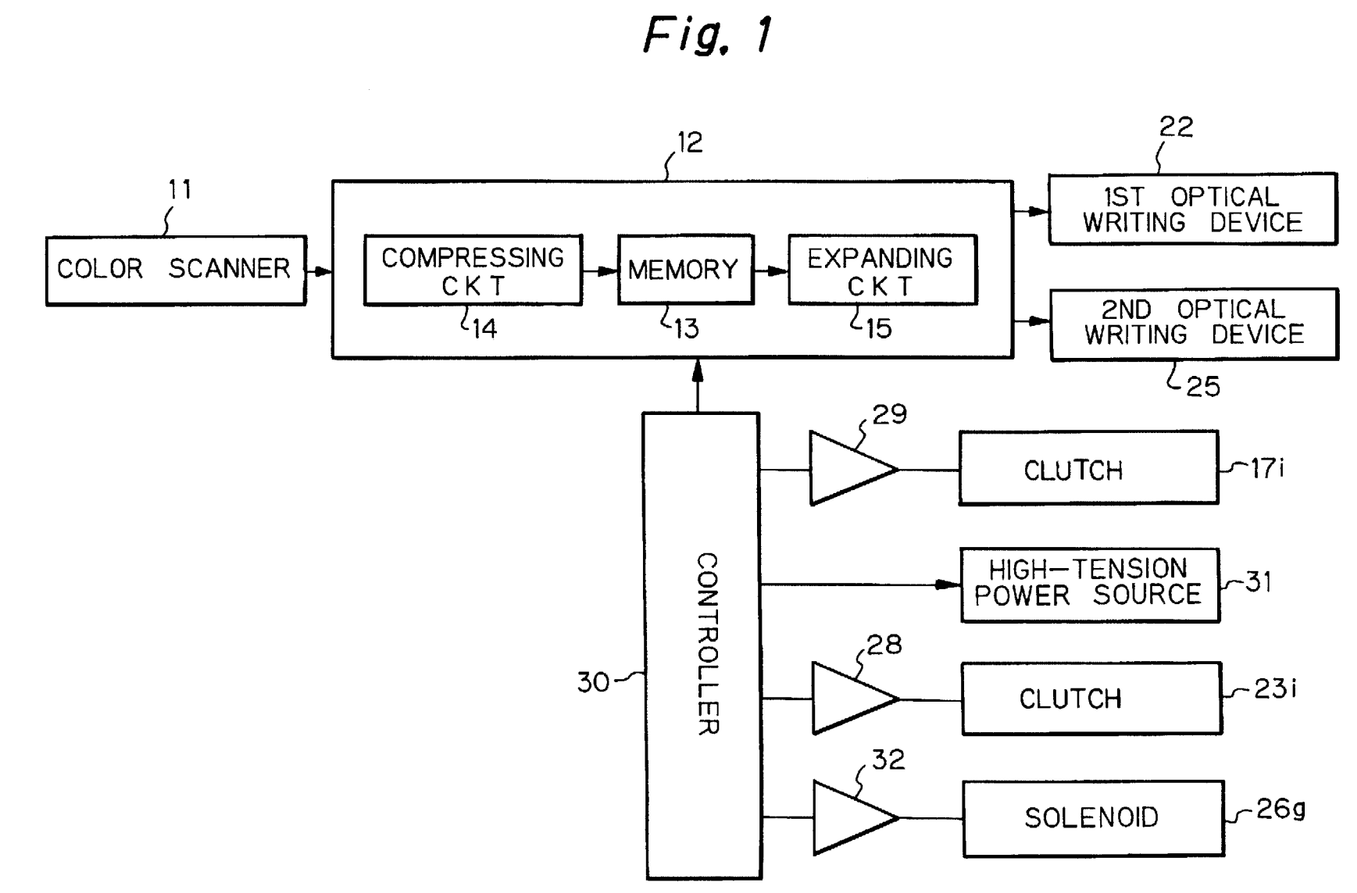
FIG. 1 is a block diagram schematically showing a part of circuitry representative of a first embodiment of an image forming apparatus in accordance with the present invention.

Referring to FIG. 1 of the drawings, a first embodiment is implemented as a color laser copier. The copier has a color scanner or reading means 11 on the top of its body. An ADF and a sorter may be mounted to the copier, as desired.

The color scanner 11 reads a document laid on a glass platen thereof, not shown, while separating it into two colors, e.g., black and red. As a result, digital image signals representative of black data and red data, respectively, are output from the scanner 11. The ADF sequentially conveys a stack of documents of the same kind or of different kinds to the glass platen one by one. The document scanned by the scanner 11 on the glass platen is driven out of the platen. An image processing section 12 executes preselected processing with the black and red digital image signals input from the scanner 11. The image signals are once written to a memory 13 included in the processing section 12. At this instant, if the image signals are directly written to the memory 13, then the memory 13 must have a capacity great enough to accommodate the entire image signals. Such a memory increases the cost of the copier.

In light of the above, the processing section 12 includes a compressing circuit 14 for compressing, in a copier mode, the digital image signals input from the scanner 11. The image signals compressed by the circuit 14 are written to the memory 13. In a printer mode, the processing section 12 writes compressed digital image signals received from a host in the memory 13. The image signals stored in the memory 13 are read out and applied to an expanding circuit 15. The image signals expanded by the circuit 15 are sent to a first and a second optical writing device or writing means 22 and 25 included in an image forming section. In response, the writing devices 22 and 25 each write the image signals in an image carrier, not shown. Further, the processing section 12 executes preselected processing before the compression by the compressing circuit 14 and/or after the expansion by the expanding circuit 15.

Figure 9A:
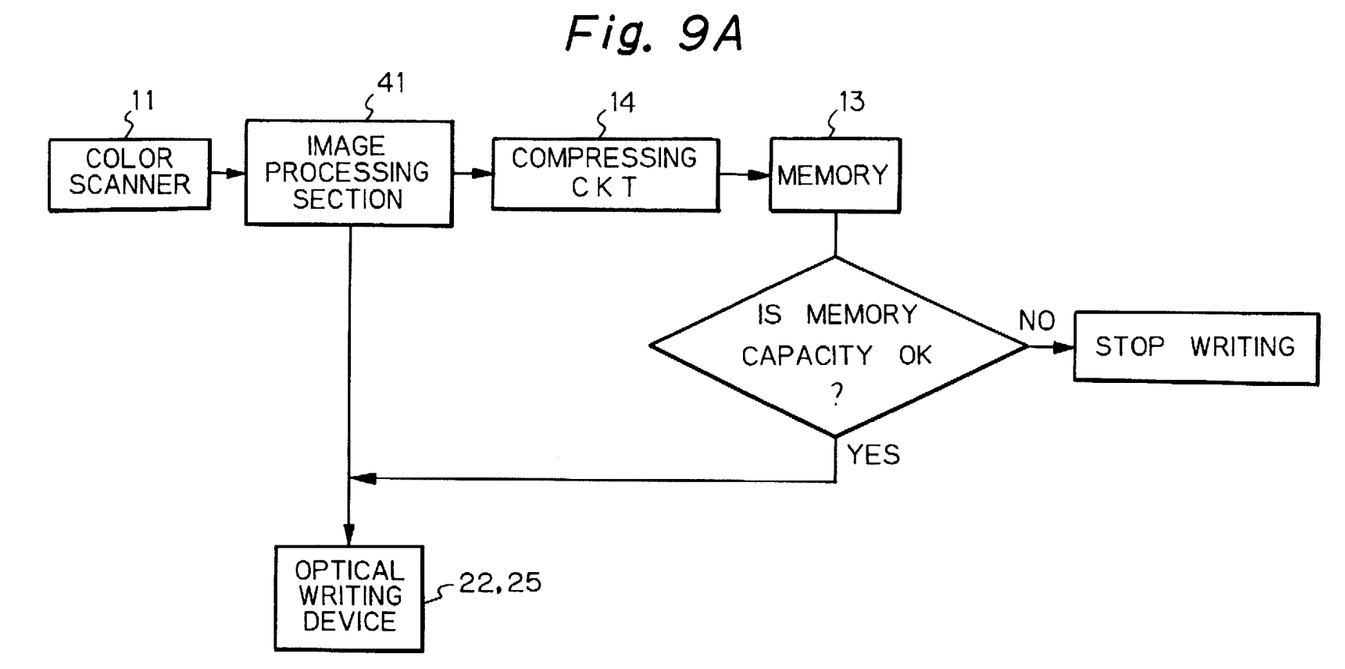
FIGS. 9A and 9B are block diagrams schematically showing a part of the first embodiment specifically.
Figure 9B:
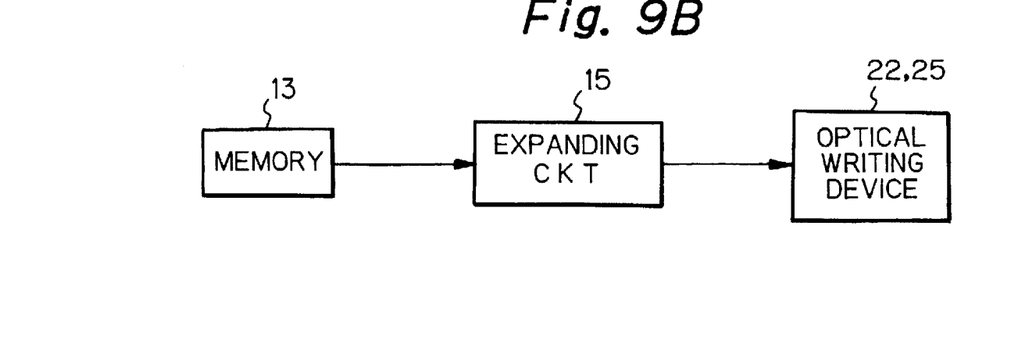

For example, as shown in FIGS. 9A and 9B, an image processing section 41 executes MTF (Modulation Transfer Function) correction and text/photo mode processing with the image data received from the scanner 11. The processed image data are compressed by the compressing circuit 14 and then written to the memory 13. The image data representative of the first document are directly fed from the processing section 41 to the optical writing devices 22 and 25. Consequently, the first copy of the first document is produced by the image forming section.

Image data representative of a plurality of documents and output from the processing section 41 are sequentially compressed by the compressing circuit 14 and written to the memory 13. The image data of the first document are repeatedly read out of the memory 13, expanded by the expanding circuit 15, and then sent to the writing devices 22 and 25. In response, the image forming section sequentially outputs the second copy and successive copies until a desired number has been reached. This is repeated with the image data of the second document and successive documents also.

The processing section 41 executes MTF correction, text/photo mode processing and other processing with the image data received from the scanner 11, as stated above. The processing time is short enough for the image data to be processed substantially at the same time as the document image is read. Therefore, in an ordinary mode in which the image data from the processing section 41 are not routed through the compressing circuit 14 or the expanding circuit 15, the copying speed is as high as a copying speed available with an analog copier. Only one of the copier mode and printer mode may be effected, if desired.

Figure 2:
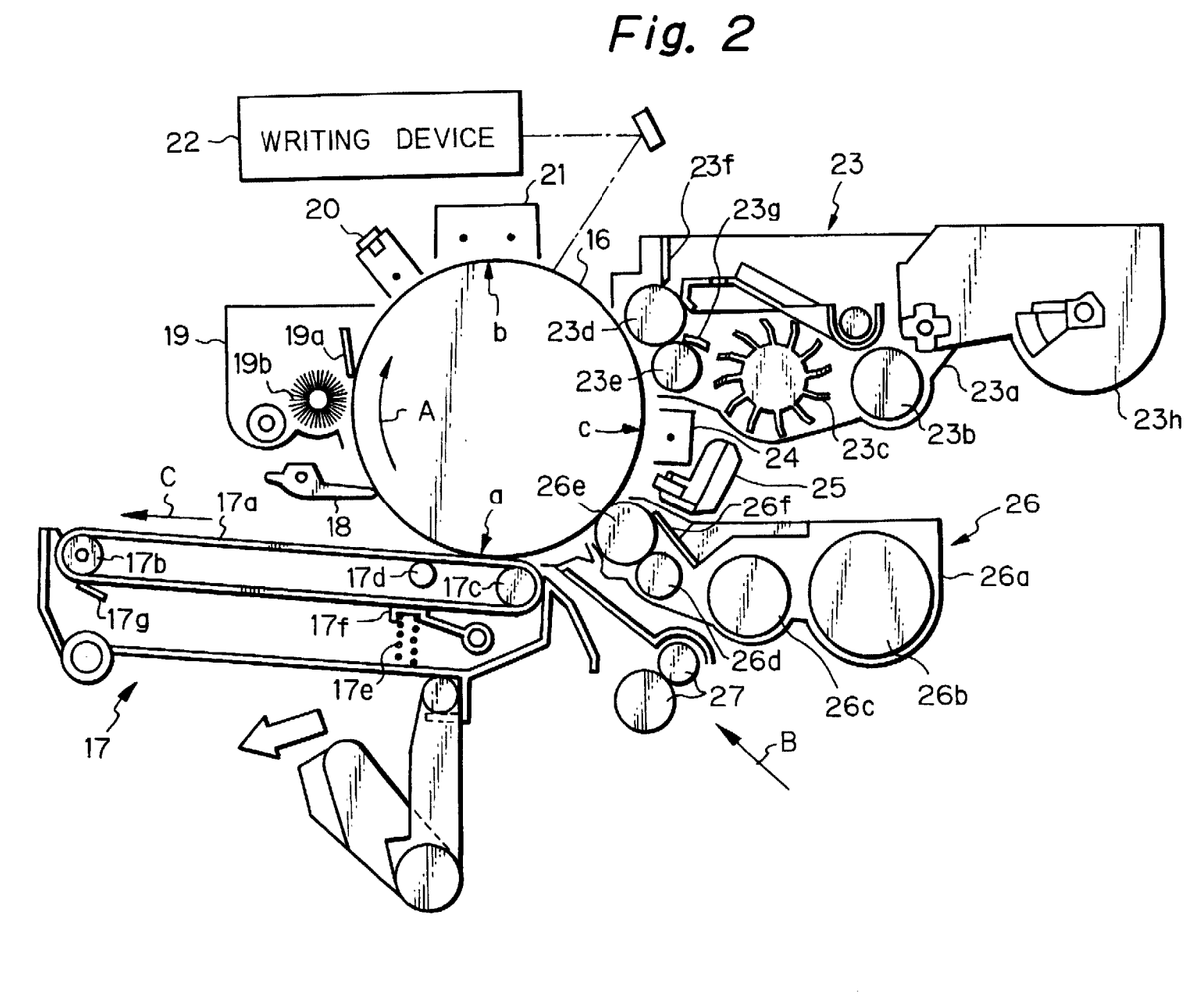
FIG. 2 is a section showing the apparatus body of the first embodiment.

As shown in FIG. 2, the image forming section includes an image carrier implemented as a photoconductive drum 16. An image transfer device 17, a paper separator 18, a drum cleaning device 19, a discharger 20, a first charger or charging means 21, the first writing device 22, a first developing device or developing means 23, a second charger or charging means 24, the second writing device 25 and a second developing device 26 are sequentially arranged around the drum 16 in this order in a direction A in which the drum 16 is rotatable. The image transfer device 17 is positioned below the drum 16.

The first developing device 23 stores a two-ingredient type developer consisting of black toner and carrier. Likewise, the second developing device 26 stores a two-ingredient type developer consisting of red toner and carrier. The first and second chargers 21 and 24, first and second writing devices 22 and 25 and first and second developing devices 23 and 26 constitute toner image forming means for forming a toner image on the drum 16.

To reproduce a color document in red and black, the operator selects a bicolor copier mode on an operation panel, not shown, sets the color document on the glass platen of the scanner 11, selects a desired paper size and other conditions on the operation panel, and then presses a start switch provided on the operation panel. In response, the scanner 11 reads the document color by color (black and red) while outputting electric digital image signals corresponding to the colors. The digital image signals are processed by the image processing section 12, compressed by the compressing circuit 14, and then written to the memory 13, as stated earlier. Subsequently, the image signals are read out of the memory 13 and then expanded by the expanding circuit 15.

In the image forming section, the drum 16 driven in the direction A by a main motor or drive source, not shown, has its surface uniformly charged by the first charger 21 at a first charging position b. The first writing device 22 emits a laser beam toward the charged surface of the drum 16 in accordance with the black digital image data received from the expanding circuit 15. The laser beam electrostatically forms a latent image representative of the black component of the document on the drum 16. The latent image is brought to the first developing device 23 by the drum 16.

The developing device 23 has a casing 23a storing the black toner and carrier mixture or developer. Agitators 23b and 23c agitate the developer while feeding it to developing rollers 23d and 23e. The rollers 23d and 23e in rotation cause the developer to magnetically deposit thereon and convey them. Doctor blades 23f and 23g regulate the amounts of toner deposited on the rollers 23d and 23e, respectively. When the developer is brought to between the rollers 23d and 23e and the drum 16, the black toner is transferred to the drum 16. As a result, the latent image on the drum 16 is developed to turn out a corresponding black toner image.

A toner replenishing section 23h replenishes fresh black toner into the casing 23a. The agitators 23b and 23c are rotated by a drive section, not shown. As shown in FIG. 1, the rollers 23d and 23e are connected to the drive source via a clutch 23i. The clutch 23i is driven by a driver 28 which is in turn controlled by a controller 30.

The part of the drum 16 moved away from the first developing device 13 reaches a second charging position c where the second charger 24 is located. The charger 24 uniformly charges the surface of the drum 16. The second writing device 25 emits a laser beam in accordance with the red digital image signal received from the expanding circuit 15. As a result, a latent image representative of the red component of the document is formed on the drum 16 over the existing black toner image. The second developing device 26 develops the latent image for thereby producing a corresponding red toner image. Consequently, a bicolor image consisting of the black toner image and red toner image is completed on the drum 16.

In the developing device 26, the red toner and carrier mixture or developer is stored in a casing 26a. Agitators 26b and 26c agitate the developer while sequentially feeding it to a draw-up roller 26d. The draw-up roller 26d supplies a developing roller 26e with the developer. The roller 26e in rotation causes the developer to magnetically deposit thereon and conveys it. A doctor blade 26f regulates the amount of toner deposited on the roller 26e. When the developer is brought to between the roller 26e and the drum 16, the red toner is transferred to the drum 16 so as to develop the latent image, as stated above. The agitators 26b and 26c, draw-up-roller 26d and developing roller 26e are rotated by a drive source, not shown.

Generally, the developing device 26 storing the red toner is used less frequently than the developing device 23 storing the black toner. For this reason, the developing device 26 is sized smaller than the developing device 23. In addition, as shown in FIG. 1, moving means including a solenoid 26g selectively moves the entire developing device 26 into or out of contact with the drum 16. The solenoid 26g is driven by a driver 32 which is in turn controlled by the controller 30.

A paper or similar recording medium of a size selected on the operation panel is fed from a cassette or paper feeding means, not shown, to a registration roller pair 27 in a direction indicated by an arrow B in FIG. 2. The roller pair 27 stops the paper and then drives it to an image transfer position between the drum 17 and the image transfer device 17 such that the leading edge of the paper meets the leading edge of the bicolor toner image. The transfer device or endless transferring and conveying means 17 includes an endless belt or conveyor member 17a.

Figure 6:
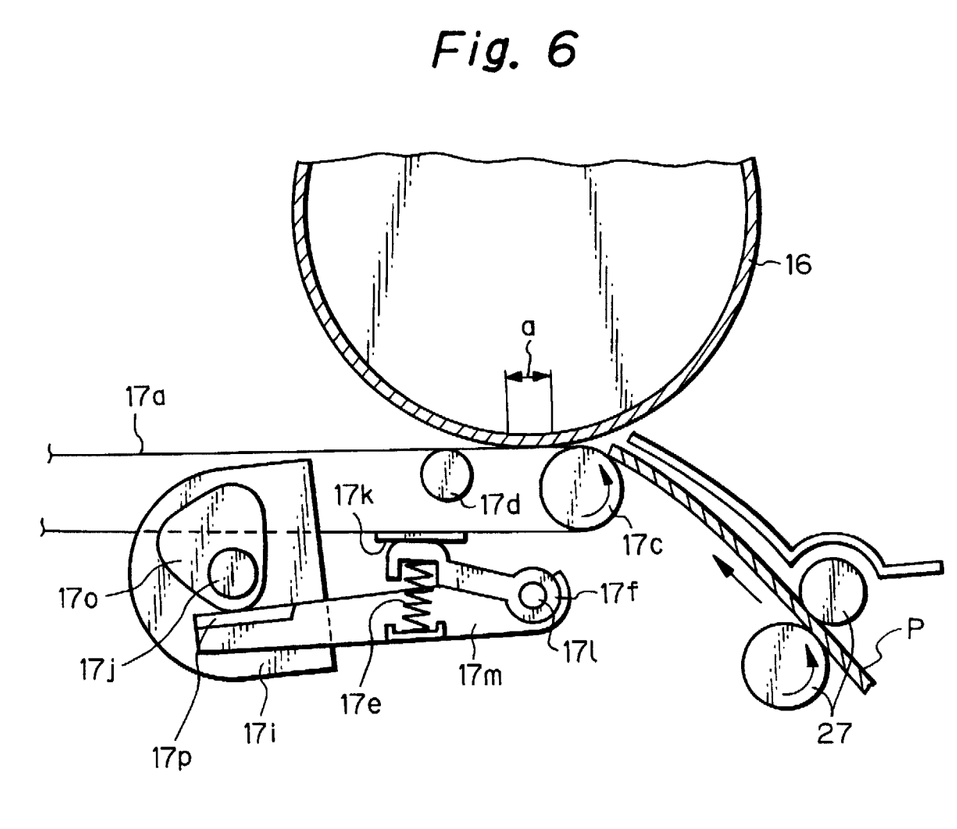
FIG. 6 is a section showing a transfer belt and a photoconductive drum contacting each other in the first embodiment.
Figure 7:
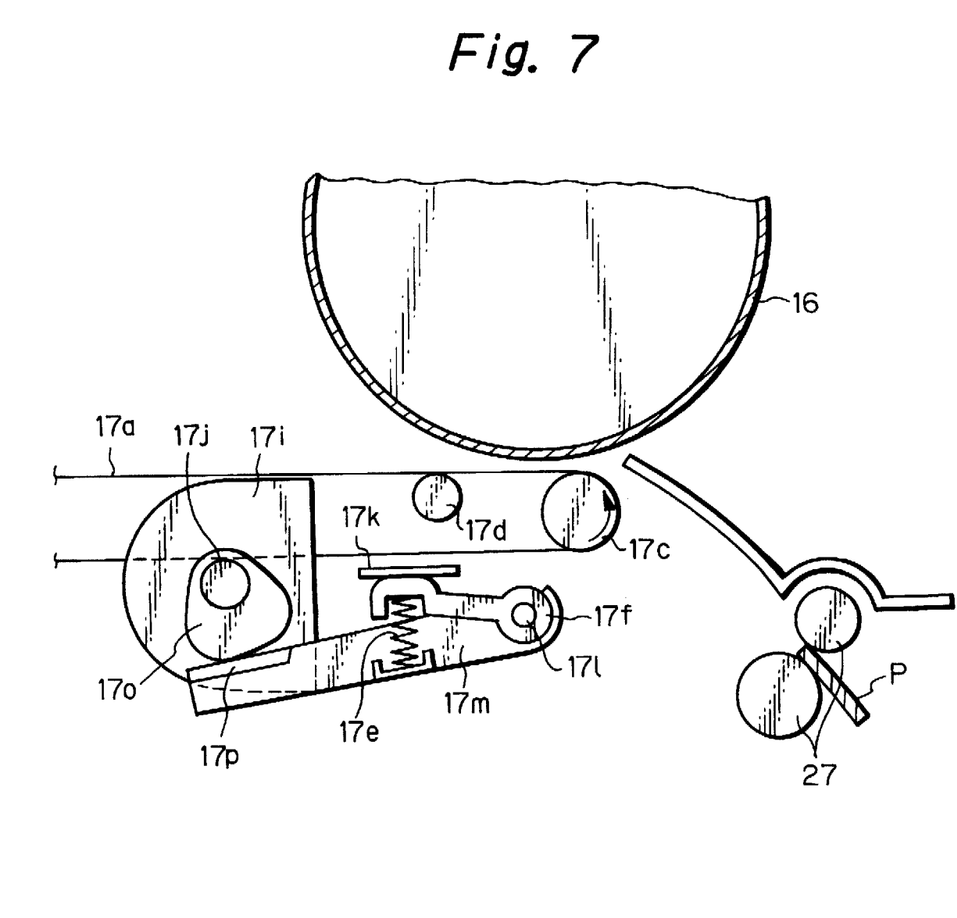
FIG. 7 is a section showing the transfer belt and photoconductive drum spaced from each other.

The belt 17a is passed over a drive roller 17b, a driven roller 17c, and a bias roller 17d. The drive roller 17b is rotated by a drive source, not shown, to in turn rotate the belt 17a. FIGS. 6 and 7 shows a specific configuration of belt moving means for moving the belt 17a into and out of contact with the drum 16 via the paper. As shown, a half-rotation clutch 17i is controlled by the controller 30 such that the belt 17a usually remains in a lowered position spaced from the drum 16 (FIG. 7). During the course of image transfer, the clutch 17i is caused to press the belt 17a against the drum 16, as shown in FIG. 6.

Specifically, the belt moving device has a contact plate 17k positioned below a frame, not shown, which supports the drive roller 17b, driven roller 17c, and bias roller 17c. A press arm 17f contacts the underside of the contact plate 17k at its one end or free end, while having its other end or base end rotatably supported by a shaft 17l. A lever 17m is also supported by the shaft 17l at its one end. A cam 17o is affixed to a rotary shaft 17j and held in contact with the other end of the lever 17m. The half-rotation clutch 17i is mounted between the shaft 17j and the main motor via gears.

The end 17b of the lever 17m contacting the cam 17o has a preselected width based on the thickness of the cam 17o. A compression spring 17e is loaded between the lever 17m and the free end of the press arm 17f. The lever 17m presses the press arm 17f from the above via a stay, not shown, mounted on the rotary shaft 17j. In this condition, the bias acting on the underside of the press arm 17f, i.e., the expanding force of the spring 17e is regulated. When the cam 17o is rotated, the lever 17m is raised or lowered to in turn move the press arm 17f up or down about the shaft 17l. The press arm 17f moves the contact plate 17k up or down and thereby brings the rollers 17b, 17c and 17d and belt 17a toward or away from the drum 16.

The half-rotation clutch 17i is driven by a driver 29 which is in turn controlled by the controller 30. In the event of image transfer, the clutch 17i performs half a rotation and causes the spring 17e and press lever 17f to press the belt 17a against the drum 16 via the paper, as shown in FIG. 6. A high-tension power source or charge applying meas 31 applies a transfer bias to the belt 17a via the bias roller or transfer electrode 17d under the control of the controller 30, so that charge is deposited on the belt 17a.

The belt 17a charged by the power source 31 retains the paper coming out of the registration roller pair 17 and conveys it. After the toner image has been transferred from the drum 16 to the paper at the previously mentioned position a, the paper is separated from the drum 16 and then conveyed by the belt 17a in a direction indicated by an arrow C in FIG. 2. Even if the paper is not separated from the drum 16, it is surely separated by the paper separator 18.

Subsequently, the paper is separated from the belt 17a at a position where the drive roller 17b is located. Then, a fixing device or fixing means, not shown, fixes the toner image on the paper. Finally, the paper or copy is driven out of the copier body by an outlet roller, not shown. When the sorter is mounted to the copier body, and a sorter mode is selected, the copy driven out of the copier body is distributed to one bin of the sorter.

After the image transfer, the drum cleaning device 19 removes the toner remaining on the drum 16. The cleaning device 19 has an elastic cleaning blade 19a and a cleaning brush 19b. The discharger 20 dissipates the charge also remaining on the drum 16 after the image transfer. A belt cleaning device or cleaning means for cleaning the belt 17a is implemented by an elastic cleaning blade 17g located downstream of the paper separating position in the direction of rotation of the belt 17a. The belt 17g removes the toner from the belt 17a while the belt 17a is in rotation.

The above copying operation is started on the operation of the start switch and repeated until the desired number of copies have been output. Assume that a black or monocolor mode (copy mode) is selected on the operation panel. Then, the second charger 24, second writing device 25 and second developing device 26 are held inoperative. The scanner 11 reads the black component of the color document set on the glass platen, while generating an electric digital signal representative of the black component. As a result, only a black toner image is formed on the drum 16 and then transferred to the paper.

When a printer mode is selected on the operation panel, the scanner 11 is held inoperative. Compressed image data received from a host are written to the memory 13. Subsequently, the image data are read out of the memory 13, expanded by the expanding circuit 15, and then sent to the image forming section. In response, the image forming section forms a toner image on a paper in the same manner as in the copier mode.

Assume that the operator desires to obtain five copies of each of ten different kinds of documents (ten documents). Then, the operator selects the copier mode and sort mode on the operation panel, puts the ten documents on the ADF, sets the desired number of copies "5" on the panel, selects a desired paper size and other conditions on the panel, and then presses the start switch. In response, the ADF sequentially conveys the documents to the glass platen one by one. The scanner 11 reads the document set on the glass platen and transforms it to electric digital image signals.

After the document on the glass platen has been read by the scanner 11, the ADF drives it out of the glass platen. The image processing section 12 sequentially executes the previously mentioned processing with the digital image signals input from the scanner 11 and representative of the ten consecutive documents. The processing section 12 outputs the digital image signals representative of the first document. At the same time, the image signals representative of the ten documents are sequentially compressed by the compressing circuit 14 and written to the memory 13.

The image forming section produces the first copy of the first document on the basis of the above digital image signals in the previously stated manner. Subsequently, the processing section 12 reads the digital image signals of the first document out of the memory 13 in order to produce the second copy of the first document. These image signals are expanded by the expanding circuit 15 and then sent to the image forming section. In response, the image forming section produces the second copy of the first document.

Thereafter, the processing section 12 reads the image signals of the first document out of the memory 13 three more times in order to produce the third to fifth copies of the first document. As a result, the image forming section produces the third to fifth copies of the first document in the same manner.

Next, the processing section 12 reads the digital image signals of the second document out of the memory 13 five consecutive times in order to produce five copies of the second document. The image forming section receiving the image signals produce five copies of the second document as with the image signals of the first document. This is also true with the third to tenth documents. Consequently, five copies are sequentially output with each of the first to tenth documents.

It has been customary with an image forming apparatus to execute the same operation as during the interval between consecutive image formation (non-image forming operation) even when an image processing section is compressing digital image signals input from a color scanner in a copier mode and storing them in a memory, and when it is reading them out of the memory in the copier body or the printer mode and expanding them. In the illustrative embodiment, during the period of time in which the digital image signals from the scanner 11 are compressed by the compressing circuit 14 and written to the memory 13, and during the period of time in which they are read out of the memory 13 and expanded by the expanding circuit 15 in the copier mode or the printer mode, the mechanical operation of the copier body is interrupted.

Figure 3:
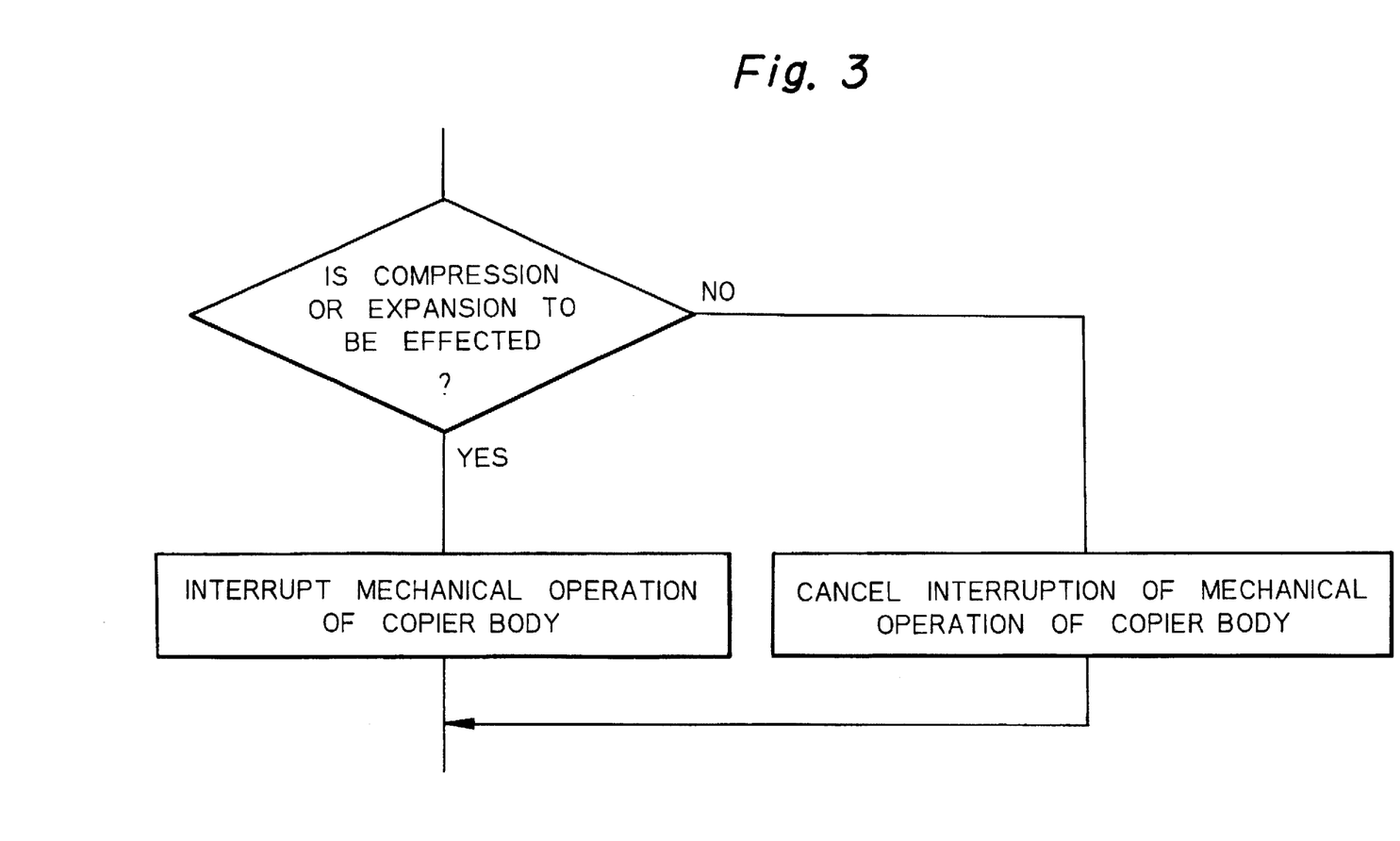
FIG. 3 is a flowchart demonstrating a specific operation of a controller included in the embodiment.

Specifically, as shown in FIG. 3, the controller 30 kills the drive sources associated with the drum 16, developing devices 23 and 26, image transfer device 17, drum cleaning device 19 and so forth during the above periods of time. As a result, the mechanical operation of the entire copier body is interrupted. This successfully reduces the wear of the copier body and reduces the amount of toner to reach the cleaning blade 17g assigned to the belt 17a. Consequently, the contamination of the paper or recording medium ascribable to defective cleaning is obviated, so that desirable images are insured.

As stated above, the embodiment has the drum or image carrier 16, image processing section 12 for processing the image data to be written to the drum 16, developing devices 23 and 26 each for developing the image data written to the drum 16 to thereby produce a toner image, and endless transferring and conveying means 17 for conveying the paper and electrostatically transferring the toner image from the drum 16 to the paper. While the processing means 12 is performing image processing (in this case, compression and expansion of the image data), the controller 30 interrupts the mechanical operation of the image forming section. This reduces the amount of toner to reach the cleaning section assigned to the transferring and conveying means and thereby obviates the contamination of the paper ascribable to defective cleaning, thereby insuring desirable images.

Further, the compressing circuit 14 compresses the image data output from the color scanner or reading means 11 and representative of a document. The compressed image data are written to the memory 13. The expanding circuit 13 expands the image data read out of the memory 13. While the compression of the image data by the compressing circuit 14 is under way, the controller 30 interrupts the mechanical operation of the image forming section. This also reduces the amount of toner to reach the cleaning section assigned to the transferring and conveying means and thereby obviates the contamination of the paper ascribable to defective cleaning, thereby insuring desirable images. In addition, the controller 30 interrupts the mechanical operation of the image forming section while the expansion of the image data by the expanding circuit 15 is under way.

Moreover, when compressed image data are received from a host connected to the apparatus, they are written to the memory 13. The expanding circuit 15 expands the image data read out of the memory 13. Again, while the expansion by the expanding circuit 15 is under way, the controller 30 interrupts the mechanical operation of the image forming section. This also reduces the amount of toner to reach the cleaning section assigned to the transferring and conveying means and thereby obviates the contamination of the paper ascribable to defective cleaning, thereby insuring desirable images.

2nd Embodiment

In the first embodiment, a second embodiment to be described causes the controller 30 to uncouple the clutch 23i while the compressing circuit 14 is compressing the digital image signals received from the scanner 11 and storing the compressed signals in the memory 13 and while the expanding circuit 15 is reading them out and expanding them. As a result, the first developing device 23 has its developing rollers 23d and 23e held in a halt during the course of the compression and expansion of the image signals.

In this configuration, the toner is prevented from being fed from the agitator 23c to the developing rollers 23d and 23e during the above periods of time. Therefore, the undesirable deposition of toner on the drum 16 is obviated. Consequently, the toner is inhibited from depositing on the belt 17a at the image transfer position a during the above periods of time. This reduces the amount of toner to reach the cleaning section assigned to the belt 17a and thereby obviates the contamination of the paper ascribable to defective cleaning, thereby insuring desirable images.

As stated above, in the illustrative embodiment, the first developing device 23 has the drum 16, rotatable developing rollers 23d and 23e for transferring the toner to the drum 16, and clutch 23i for driving the rollers 23d and 23e. The controller uncouples the clutch 23i while the image processing by the image processing section 12 (in this case, data compression and expansion) is under way. As a result, the rollers 23d and 23e are held in a halt during the above periods of time. This reduces the amount of toner to reach the cleaning section assigned to the endless transferring and conveying means and thereby obviates the contamination of the paper ascribable to defective cleaning, thereby insuring desirable images.

Further, the compressing circuit 14 compresses the image data output from the color scanner or reading means 11 and representative of a document. The compressed image data are written to the memory 13. The expanding circuit 13 expands the image data read out of the memory 13. While the compression of the image data by the compressing circuit 14 is under way, the controller 30 interrupts the mechanical operation of the image forming section (in this case, rotation of the rollers 23d and 23e). This also reduces the amount of toner to reach the cleaning section assigned to the transferring and conveying means and thereby obviates the contamination of the paper ascribable to defective cleaning, thereby insuring desirable images. In addition, the controller 30 interrupts the mechanical operation of the image forming section while the expansion of the image data by the expanding circuit 15 is under way.

Moreover, when compressed image data are received from the host, they are written to the memory 13. The expanding circuit 15 expands the image data read out of the memory 13. Again, while the expansion by the expanding circuit 15 is under way, the controller 30 interrupts the mechanical operation of the image forming section (in this case, rotation of the rollers 23d and 23e). This also reduces the amount of toner to reach the cleaning section assigned to the transferring and conveying means and thereby obviates the contamination of the paper ascribable to defective cleaning, thereby insuring desirable images.

In the first and second embodiments, the controller 30 interrupts the mechanical operation of the image forming section both when the image data received from the reading means 11 are compressed and written to the memory 13 in the copier mode and when the compressed data are read out of the memory 13 and expanded in the copier mode or the printer mode. Alternatively, the mechanical operation of the image forming section may be interrupted during only one of the above two periods of time.

3rd Embodiment

In the second embodiment, a third embodiment to be described is such that while the compressing circuit 14 is compressing the digital image signals receiving from the scanner 11 and writing the compressed signals in the memory 13 and while the expanding circuit 15 is expanding the compressed signals read out of the memory 13, the controller 30 controls the solenoid 26g in such a manner as to release the second developing device 26 from the drum 16.

In the above configuration, the undesirable deposition of toner on the drum 16 by the developing device 26 is obviated. Consequently, the toner is inhibited from depositing on the belt 17a at the image transfer position a during the above periods of time. This reduces the amount of toner to reach the cleaning section assigned to the belt 17a and thereby obviates the contamination of the paper ascribable to defective cleaning, thereby insuring desirable images.

As stated above, the illustrative embodiment has the moving means including the solenoid 26 for moving the developing device 26 into and out of contact with the drum 16. While the image processing by the processing section (in this case, compression and expansion of image data) is under way, the controller 30 causes the moving means to release the developing device 26 from the drum 16. This reduces the amount of toner to reach the cleaning section assigned to the transferring and conveying means and thereby obviates the contamination of the paper ascribable to defective cleaning, thereby insuring desirable images.

Further, the compressing circuit 14 compresses the image data output from the color scanner or reading means 11 and representative of a document. The compressed image data are written to the memory 13. The expanding circuit 13 expands the image data read out of the memory 13. While the compression of the image data by the compressing circuit 14 is under way, the controller 30 interrupts the mechanical operation of the image forming section (in this case, release of the developing device 26 from the drum 16). This also reduces the amount of toner to reach the cleaning section assigned to the transferring and conveying means and thereby obviates the contamination of the paper ascribable to defective cleaning, thereby insuring desirable images. In addition, the controller 30 interrupts the above mechanical operation of the image forming section when the expansion of the image data by the expanding circuit 15 is under way.

Moreover, when compressed image data are received from the ho st, they are written to the memory 13. The expanding circuit 15 expands the image data read out of the memory 13. Again, while the expansion by the expanding circuit 15 is under way, the controller 30 interrupts the mechanical operation of the image forming section (in this case, release of the developing device 26 from the drum 16). This also reduces the amount of toner to reach the cleaning section assigned to the transferring and conveying means and thereby obviates the contamination of the paper ascribable to defective cleaning, thereby insuring desirable images.

4th Embodiment

In the third embodiment, a fourth embodiment to be described is such that while the compressing circuit 14 is compressing the digital image signals receiving from the scanner 11 and writing the compressed signals in the memory 13 in the copier mode and while the expanding circuit 15 is expanding the compressed signals read out of the memory 13 in the copier mode or the printer mode, the controller 30 so operates the clutch 17i as to lower the belt 17a away from the drum 16. As a result, the toner is prevented from being transferred from the drum 16 to the belt 17a during the above periods of time. This reduces the amount of toner to reach the cleaning section assigned to the belt 17a and thereby obviates the contamination of the paper ascribable to defective cleaning, thereby insuring desirable images.

As stated above, in the illustrative embodiment, the image transfer device or endless transferring and conveying means 17 has the belt 17a, bias roller 17d for depositing transfer charge on the belt 17a, and moving means for moving the belt 17a into and out of contact with the drum 16 and including the half-rotation clutch 17i. While the image processing means is executing image processing, the controller 30 releases the belt 17a from the drum 16 via the clutch 17i. This reduces the amount of toner to reach the cleaning section assigned to the belt or endless conveyor member and thereby obviates the contamination of the paper ascribable to defective cleaning, thereby insuring desirable images.

Further, the compressing circuit 14 compresses the image data output from the color scanner or reading means 11 and representative of a document. The compressed image data are written to the memory 13. The expanding circuit 13 expands the image data read out of the memory 13. While the compression of the image data by the compressing circuit 14 is under way, the controller 30 interrupts the mechanical operation of the image forming section (in this case, release of the belt 17a from the drum 16). This also reduces the amount of toner to reach the cleaning section assigned to the belt 17a and thereby obviates the contamination of the paper ascribable to defective cleaning, thereby insuring desirable images. In addition, the controller 30 interrupts the above mechanical operation of the image forming section while the expansion of the image data by the expanding circuit 15 is under way.

Moreover, when compressed image data are received from the host, they are written to the memory 13. The expanding circuit 15 expands the image data read out of the memory 13. Again, while the expansion by the expanding circuit 15 is under way, the controller 30 interrupts the mechanical operation of the image forming section (in this case, release of the belt 17a from the drum 16). This also reduces the amount of toner to reach the cleaning section assigned to the transferring and conveying means and thereby obviates the contamination of the paper ascribable to defective cleaning, thereby insuring desirable images.

In the fourth embodiment, the controller 30 lowers the belt 17a away from the drum 16 both when the image data received from the reading means 11 are compressed and written to the memory 13 in the copier mode and when the compressed data are read out of the memory 13 and expanded in the copier mode or the printer mode. If desired, the controller 30 may release the belt 17a from the drum 16 during only one of the above periods of time.

In any of the embodiments shown and described, the endless conveyor member may be implemented as a drum in place of the belt 17a. The drum is comparable with the belt 17a in respect of advantages.

In the fourth embodiment, while the image data output from the reading means 11 are compressed and written to the storing means 13 in the copier mode and while the compressed data are sequentially read out of the storing means 13 and expanded in the copier mode Or the printer mode, the clutch 23i is uncoupled to stop the rotation of the developing rollers 23d and 23e of the first developing device 23. At the same time, the solenoid 26g is controlled to release the second developing device 26 from the drum 16. Further, the half-rotation clutch 17i is controlled to lower the belt 17a away from the drum 16. Alternatively, one or more of the above operations may be effected during only one or both of the above periods of time.

5th Embodiment

Figure 4:
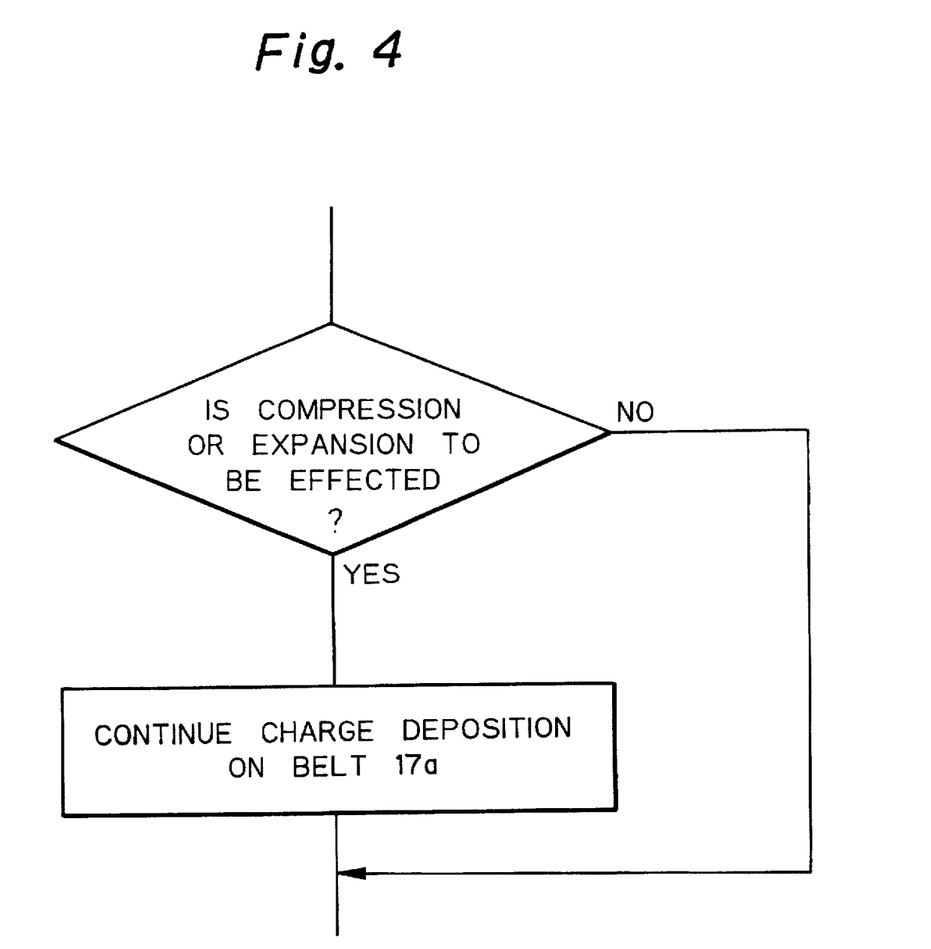
FIG. 4 is a flowchart showing a specific operation of the controller and representative of a fifth embodiment of the present invention.
Figure 5:
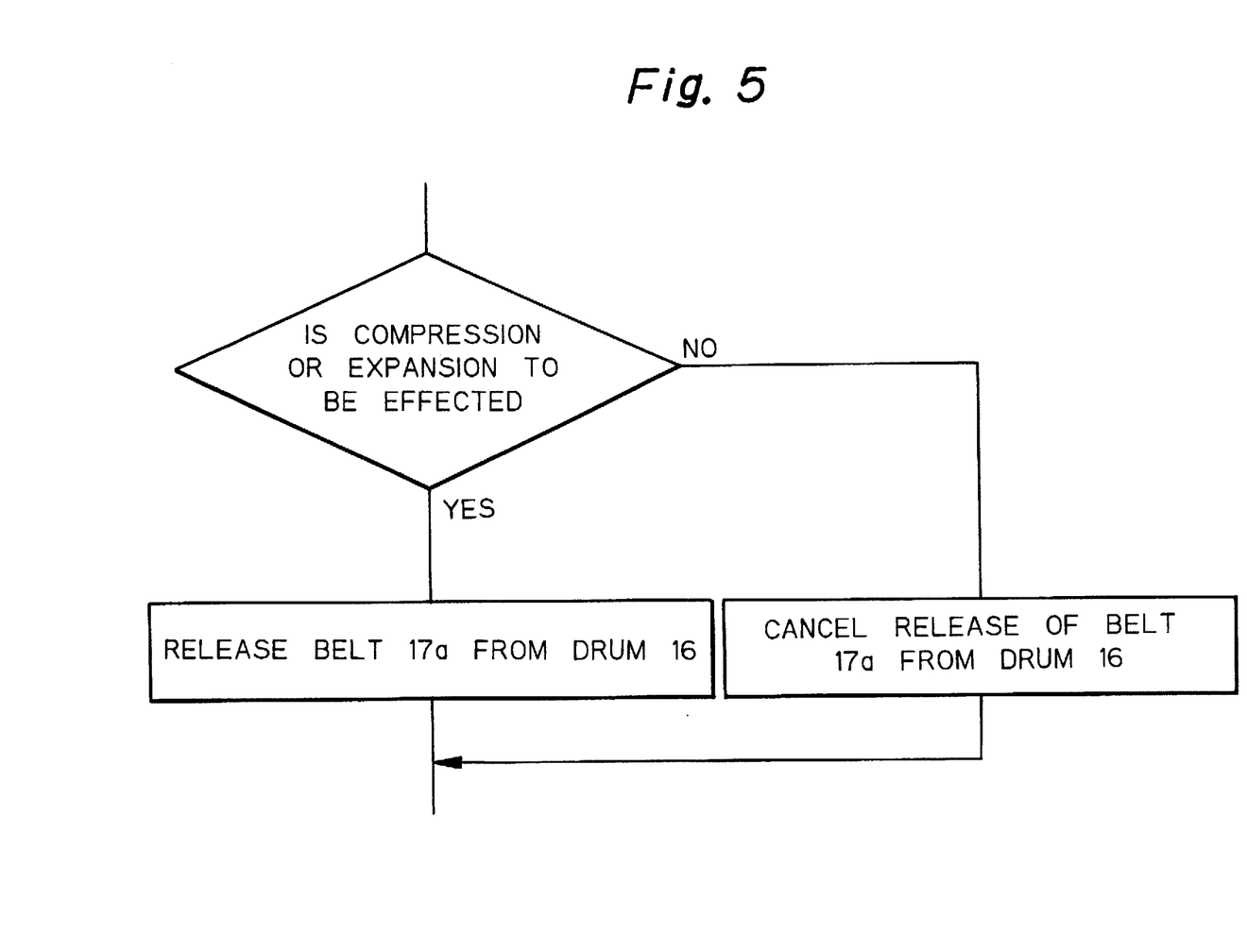
FIG. 5 is a flowchart showing a specific operation of the controller and representative of a fourth embodiment of the present invention.
Figure 8:
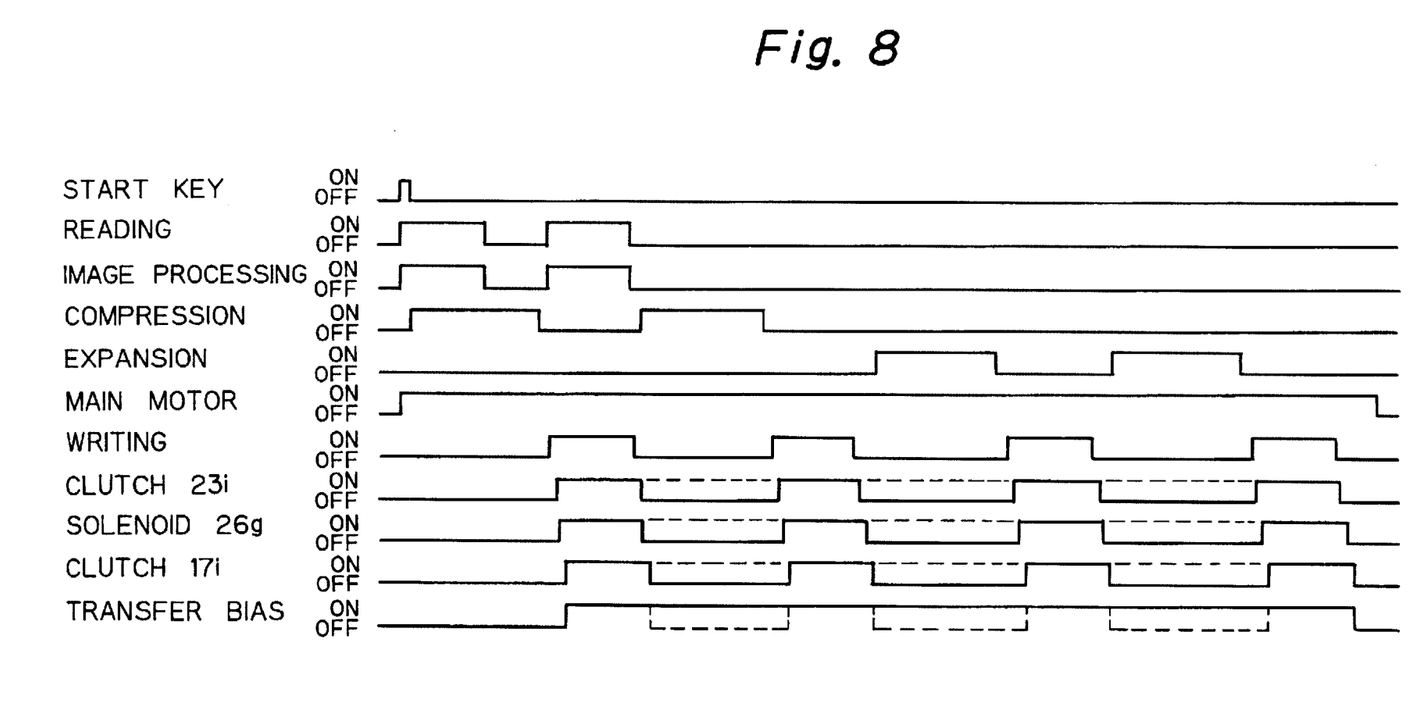
FIG. 8 is a timing chart demonstrating the operation of the fifth embodiment and that of a conventional image forming apparatus.

In the fourth embodiment, a fifth embodiment to be described is such that while the compressing circuit 14 is compressing the digital image signals receiving from the scanner 11 and writing the compressed signals in the memory 13 in the copier mode and while the expanding circuit 15 is expanding the compressed signals read out of the memory 13 in the copier mode or the printer mode, the controller 30 controls the high-tension power source 31 such that the transfer bias is continuously applied to the belt 17a via the bias roller 17d, as shown in FIG. 4. In this condition, charge is continuously deposited on the belt 17a during the above periods of time. FIG. 8 demonstrates a specific operation of the fifth embodiment for producing two copies with each of two documents. In FIG. 8, solid lines and dashed lines are respectively representative of the operation of the fifth embodiment and that of a conventional image forming apparatus.

Generally, during the interval between consecutive image formation in a repeat copy mode, much of the toner deposited on the drum 16 has a charge opposite in polarity to the toner deposited on the drum 16 by the developing device for forming a desired image. Such toner would be undesirably transferred from the drum 16 to the belt 17a if the charge were not deposited on the belt 17a.

Specifically, to produce a desired image, the toner in the developing device should preferably be uniformly charged. In practice, however, the amount of charge deposited on the individual toner particle differs from a desired amount due to irregularity in the particle size and agitating condition. The toner having the desired charge is transferred to a paper to produce a hard copy while the other toner deposits on the drum 16 in a non-image portion where the paper is absent.

In the non-image portion, the belt 17a and drum 16 directly contact each other. The toner deposited on the drum 16 in the non-image portion as mentioned above is the toner not charged to the expected polarity. As a result, during the interval between consecutive image formation in the repeat copy mode, the toner deposited on the drum 16 in the non-image portion is undesirably transferred from the drum 16 to the belt 17a if the charge is not deposited on the belt 17a.

In the fifth embodiment, while the compressing circuit 14 is compressing the digital image signals receiving from the scanner 11 and writing the compressed signals in the memory 13 in the copier mode and while the expanding circuit 15 is expanding the compressed signals read out of the memory 13 in the copier mode or the printer mode, the controller 30 causes the high-tension power source 31 to continuously apply the transfer bias to the belt 17, as stated above. As a result, charge of the same polarity as the toner deposited on the drum 16 in the non-image portion is continuously applied to the belt 17a during the above periods of time. This reduces the toner to be transferred from the drum 16 to the belt 17a during the interval between consecutive image formation and thereby reduces the toner to reach the cleaning section assigned to the belt 17a. Consequently, the paper is free from contamination ascribable to defective cleaning and turns out an attractive hard copy.

As stated above, in the illustrative embodiment, the image processing section 12 processes the image data to be written to the drum 16. The developing devices 23 and 26 each develops image data written to the drum 16 with toner. The endless transferring and conveying means 17 has the belt 17a for conveying a paper carrying the resulting toner image thereon, and the bias roller 17d for depositing charge on the belt 17a. While the image processing means 12 is executing image processing, the controller 30 causes charge to be continuously applied to the bias roller or transfer electrode 17d. This reduces the toner to reach the cleaning section assigned to the endless transferring and conveying means and thereby frees the paper from contamination ascribable to defective cleaning, thereby insuring desirable images.

The charge deposited on the transfer electrode 17d throughout the image processing period is of the same polarity as the toner. This also reduces the toner to reach the cleaning section assigned to the endless transferring and conveying means and thereby frees the paper from contamination ascribable to defective cleaning, thereby insuring desirable images.

The transfer electrode 17d applies the charge to the belt 17a in contact with the belt 17a. This further reduces the toner to reach the cleaning section assigned to the endless transferring and conveying means and thereby frees the paper from contamination ascribable to defective cleaning, thereby insuring desirable images.

Further, the compressing circuit 14 compresses the image data output from the color scanner or reading means 11 and representative of a document. The compressed image data are written to the memory 13. The expanding circuit 13 expands the image data read out of the memory 13. While the compression of the image data by the compressing circuit 14 is under way, the controller 30 interrupts the mechanical operation of the image forming section. This also reduces the amount of toner to reach the cleaning section assigned to the endless transferring and conveying means and thereby obviates the contamination of the paper ascribable to defective cleaning, thereby insuring desirable images. In addition, the controller 30 interrupts the above mechanical operation of the image forming section while the expansion of the image data by the expanding circuit 15 is under way.

Moreover, when compressed image data are received from the host, they are written to the memory 13. The expanding circuit 15 expands the image data read out of the memory 13. Again, while the expansion by the expanding circuit 15 is under way, the controller 30 interrupts the mechanical operation of the image forming section (in this case, release of the belt 17a from the drum 16). This additionally reduces the amount of toner to reach the cleaning section assigned to the transferring and conveying means and thereby obviates the contamination of the paper ascribable to defective cleaning, thereby insuring desirable images.

In the fifth embodiment, while the image data output from the reading means 11 are compressed and written to the storing means 13 in the copier mode and while the compressed data are sequentially read out of the storing means 13 and expanded in the copier mode or the printer mode, the transfer charge is continuously applied to the transfer electrode 17d. Alternatively, the continuous application of the transfer charge to the transfer electrode 17d may be effected only one of the above periods of time.

The above advantages of the fifth embodiment are also attainable even if the transfer belt 17a is replaced with a transfer drum.

In summary, in an image forming apparatus having endless transferring and conveying means for conveying a recording medium and electrostatically transferring a toner image from an image carrier to the medium, the present invention interrupts the mechanical operation of an image forming section while image processing means is executing preselected image processing. As a result, the amount of toner to reach a cleaning section assigned to the endless transferring and conveying means is reduced. This frees the recording medium from contamination ascribable to defective cleaning and thereby insures desirable images.

Various modifications will become possible for those skilled in the art after receiving the teachings of the present disclosure without departing from the scope thereof. For example, the present invention is applicable not only to a copier but also to a facsimile apparatus, printer or the like.

What is claimed is:

1. An image forming apparatus having an image forming section, comprising:
    an image carrier for forming a toner image thereon;
    image processing means for processing image data to be written to said image carrier;
    developing means for developing the image data processed by said image processing means and written to said image carrier with toner to thereby produce a corresponding toner image;
    endless transferring and .conveying means for conveying a recording medium and electrostatically transferring the toner image from said image carrier to said recording medium; and
    control means for interrupting a mechanical operation of said image forming section throughout a duration of processing of the image data by said image processing means.

2. An apparatus as claimed in claim 1, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while compression of the image data by said compressing means is under way.

3. An apparatus as claimed in claim 1, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while expansion of the image data by said expanding means is under way.

4. An apparatus as claimed in claim 1, wherein said image processing means comprises:
    storing means for storing image data received from a host connected to said apparatus; and
    expanding means for reading the image data out of said storing means and expanding said image data;
    wherein said control means interrupts the mechanical operation of said image forming section while expansion of the image data by said expanding means is under way.

5. An apparatus as claimed in claim 1, wherein said developing means comprises:
    a rotatable developing roller for conveying toner deposited thereon and causing said toner to be transferred to said image carrier; and
    drive means for causing said developing roller to rotate;
    wherein said control means renders said drive means inoperative and thereby interrupts a rotation of said developing roller while the processing of the image data by said image processing means is under way.

6. An apparatus as claimed in claim 5, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while compression of the image data by said compressing means is under way.

7. An apparatus as claimed in claim 5, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while expansion of the image data by said expanding means is under way.

8. An apparatus as claimed in claim 5, wherein said image processing means comprises:
    storing means for storing image data received from a host connected to said apparatus; and
    expanding means for reading the image data out of said storing means and expanding said image data;
    wherein said control means interrupts the mechanical operation of said image forming section while expansion of the image data by said expanding means is under way.

9. An apparatus as claimed in claim 1, further comprising moving means for selectively moving said developing means into or out of contact with said image carrier, wherein said control means causes said moving means to release said developing means from said image carrier while the processing of the image data by said image processing means is under way.

10. An apparatus as claimed in claim 9, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while compression of the image data by said compressing means is under way.

11. An apparatus as claimed in claim 9, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while expansion of the image data by said expanding means is under way.

12. An apparatus as claimed in claim 9, wherein said image processing means comprises:
    storing means for storing image data received from a host connected to said apparatus; and
    expanding means for reading the image data out of said storing means and expanding said image data;
    wherein said control means interrupts the mechanical operation of said image forming section while expansion of the image data by said expanding means is under way.

13. An apparatus as claimed in claim 1, wherein said endless transferring and conveying means comprises:
    an endless conveyor member for conveying the recording medium;
    a transfer electrode for depositing transfer charge on said endless conveyor member; and
    moving means for selectively moving said endless conveyor member toward or away from said image carrier;
    wherein said control means causes said moving means to release said endless conveyor member from said image carrier while the processing of the image data by said image processing means is under way.

14. An apparatus as claimed in claim 13, wherein said endless conveyor member comprises an endless belt.

15. An apparatus as claimed in claim 13, wherein said endless conveyor member comprises a drum.

16. An apparatus as claimed in claim 13, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while compression of the image data by said compressing means is under way.

17. An apparatus as claimed in claim 13, wherein said image processing means comprises:
    reading means for reading a document image;
    compressing means for compressing image data output from said reading means and representative of the document image to thereby produce compressed image data;
    storing means for storing the compressed image data; and
    expanding means for reading the compressed data out of said storing means and expanding said compressed data;
    wherein said control means interrupts the mechanical operation of said image forming section while expansion of the image data by said expanding means is under way.

18. An apparatus as claimed in claim 13, wherein said image processing means comprises:
    storing means for storing image data received from a host connected to said apparatus; and
    expanding means for reading the image data out of said storing means and expanding said image data;
    wherein said control means interrupts the mechanical operation of said image forming section while expansion of the image data by said expanding means is under way.

19. An image forming apparatus having an image forming section, comprising:
    an image carrier for forming a toner image thereon;
    image processing means for processing image data to be written to said image carrier;
    developing means for developing the image data processed by said image processing means and written to said image carrier with toner to thereby produce a corresponding toner image;
    endless transferring and conveying means for conveying a recording medium and electrostatically transferring the toner image from said image carrier to said recording medium, wherein said endless transferring and conveying means comprises an endless conveyor member for conveying said recording medium, and a transfer electrode for depositing transfer charge on said endless conveyor member; and control means for causing said transfer charge to be continuously applied to said transfer electrode throughout a duration of processing of the image data by said image processing means.

20. An apparatus as claimed in claim 19, wherein said transfer charge continuously applied to said transfer electrode is identical in polarity with the toner.

21. An apparatus as claimed in claim 19, wherein said endless conveyor member comprises an endless belt.

22. An apparatus as claimed in claim 19, wherein said endless conveyor member comprises a drum.

23. An apparatus as claimed in claim 19, wherein said transfer electrode applies said transfer charge to said endless conveyor member in contact with said endless conveyor member.

24. An apparatus as claimed in claim 19, wherein said image processing means comprises:

reading means for reading a document image;

compressing means for compressing image data output from said reading means and representative of the document image to thereby produce compressed image data;

storing means for storing the compressed image data; and expanding means for reading the compressed data out of said storing means and expanding said compressed data;

wherein said control means interrupts the mechanical operation of said image forming section while compression of the image data by said compressing means is under way.

25. An apparatus as claimed in claim 19, wherein said image processing means comprises:

reading means for reading a document image;

compressing means for compressing image data output from said reading means and representative of the document image to thereby produce compressed image data;

storing means for storing the compressed image data; and expanding means for reading the compressed data out of said storing means and expanding said compressed data;

wherein said control means interrupts the mechanical operation of said image forming section while expansion of the image data by said expanding means is under way.

26. An apparatus as claimed in claim 19, wherein said image processing means comprises:

storing means for storing image data received from a host connected to said apparatus; and expanding means for reading the image data out of said storing means and expanding said image data;

wherein said control means interrupts the mechanical operation of said image forming section while expansion of the image data by said expanding means is under way.

* * * * *